(12) United States Patent
Rattan et al.

(10) Patent No.: US 11,983,490 B1
(45) Date of Patent: May 14, 2024

(54) SPREADSHEET INTERFACE FOR A TRANSACTION MANAGEMENT PLATFORM

(71) Applicant: TermSheet, LLC, Kansas City, MO (US)

(72) Inventors: Sahil Rattan, Fairway, KS (US); Roger Smith, Fairway, KS (US)

(73) Assignee: TermSheet, LLC, Kansas City, MO (US)

( * ) Notice: Subject to any disclaimer, the term of this patent is extended or adjusted under 35 U.S.C. 154(b) by 0 days.

(21) Appl. No.: 17/840,893

(22) Filed: Jun. 15, 2022

Related U.S. Application Data (60) Provisional application No. 63/210,877, filed on Jun. 15, 2021.

(51) Int. Cl.
| | |
|---|---|
| *G06F 40/18* | (2020.01) |
| *G06F 9/46* | (2006.01) |
| *G06F 16/22* | (2019.01) |
| *G06Q 50/16* | (2012.01) |

(52) U.S. Cl.
CPC .............. *G06F 40/18* (2020.01); *G06F 9/466* (2013.01); *G06F 16/221* (2019.01); *G06Q 50/16* (2013.01)

(58) Field of Classification Search
CPC ........ G06F 40/18; G06F 9/466; G06F 16/221; G06Q 50/16
See application file for complete search history.

(56) References Cited

U.S. PATENT DOCUMENTS

| | | | | |
|---|---|---|---|---|
| 8,332,295 B1 * | 12/2012 | Stone | ................... | G06Q 40/123 705/31 |
| 10,366,156 B1 * | 7/2019 | Krappe | ................. | G06F 40/186 |
| 2006/0004844 A1 * | 1/2006 | Rothschiller | ......... | G06F 40/221 707/999.102 |
| 2010/0262900 A1 * | 10/2010 | Romatier | ............... | G05B 17/02 715/219 |
| 2020/0184008 A1 * | 6/2020 | Natarajan | ............. | G06F 16/116 |

* cited by examiner

*Primary Examiner* — Jennifer N Welch
*Assistant Examiner* — Amy P Hoang
(74) *Attorney, Agent, or Firm* — Kory D. Christensen (57) ABSTRACT

A computer-implemented method includes: allowing a user of a spreadsheet program to select a transaction from a list of transactions for a transaction management platform; creating a mapping sheet in a workbook of the spreadsheet program, the mapping sheet listing, in a first column, data fields associated with the selected transaction; receiving, in a second column of mapping sheet, references to cells of the workbook that correspond to the data fields in the first column; and using the mapping sheet to automatically update the data fields associated with the selected transaction with data values from the corresponding cells of the workbook in response to a user command.

18 Claims, 10 Drawing Sheets

SPREADSHEET INTERFACE FOR A TRANSACTION MANAGEMENT PLATFORM

CROSS-REFERENCE TO RELATED APPLICATIONS

This application claims the benefit of provisional application No. 63/210,877, filed Jun. 15, 2021, for SPREADSHEET PLUG-IN FOR DEAL MANAGEMENT PLATFORM, which is incorporated herein by reference.

TECHNICAL FIELD

The present disclosure relates generally to transaction management platforms and, more specifically, to interfacing spreadsheet programs with transaction management platforms.

BACKGROUND

Transaction management platforms (TMPs) are frequently used to provide end-to-end management of complex transactions, such as real-estate transactions. TMPs typically enable tracking and management of multiple transactions and may provide various features including, without limitation, document management, task/workflow management, CRM, underwriting modeling, collaboration tools, reports, templates, and the like.

One exemplary TMP is TermSheet®, available from TermSheet, LLC of Kansas City, Missouri. TermSheet® is used to streamline workflows for real estate transactions and allows real estate professionals to track their transactions, manage key contacts, streamline due diligence, automate workflows, and centralize documents.

Conventionally, underwriting modeling for real estate transactions is done in spreadsheets programs, such as Microsoft® Excel®. However, spreadsheet programs cannot perform all of the functions of a TMP. Furthermore, forcing users to switch from Excel® to another program, such as adding spreadsheet functionality to a TMP, is undesirable because Excel® is ubiquitous and highly flexible. Furthermore, such a change would disrupt a user's accustomed workflows, making the underwriting modeling process less efficient.

Conventional approaches to interfacing TMPs with spreadsheets are problematic. For example, spreadsheets can be exported to a Comma Separated Values (CSV) file, which is a delimited text file that uses a comma to separate values. A TMP can both extract certain values from a CVS file and output values to a CVS file, which can be opened in Excel®. However, using CVS files to enable data sharing between a TMP and a spreadsheet is slow and inefficient. For example, each time a user has made an update to an Excel® file, the user would have to manually upload the file to the TMP. This results in data becoming stale because it may be updated only infrequently.

SUMMARY

The Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one aspect, a system comprises: a transaction management platform and a plug-in for a spreadsheet program, wherein the plug-in comprises program code that, when executed by one or more processors, causes the one or more processors to perform operations comprising: allowing a user of the spreadsheet program to select a transaction from a list of transactions for the transaction management platform; displaying data fields associated with the selected transaction; mapping the data fields associated with the selected transaction to corresponding cells of a workbook of the spreadsheet program in response to user selections; and updating the data fields associated with the selected transaction with data values from the corresponding cells of the workbook.

In one example, the workbook comprises a mapping sheet that maps names of data fields for the selected transaction to the corresponding cells within the workbook. Accordingly, displaying the data fields may be performed by displaying the mapping sheet. The mapping sheet may include a first column including the names of the data fields and a second column including references to the corresponding cells. In one embodiment, displaying the data fields comprises creating the mapping sheet within the workbook if the mapping sheet does not already exist.

In one example, the operations further comprise saving metadata of the selected transaction in a hidden sheet of the workbook.

In one example, updating the data fields associated with the selected transaction is performed in response to a user command.

In one example, updating the data fields associated with the selected transaction is performed automatically in response to a change in a data value of a cell or at predetermined intervals.

In one example, the operations further include updating one or more cells of the workbook with data values from corresponding data fields of the selected transaction.

In one example, updating the one or more cells of the workbook with data values from corresponding data fields of selected transaction is performed automatically or in response to a user command.

In one example, the transaction comprises a real estate transaction, the transaction management platform provides document management and workflow management features, and the workbook comprises an underwriting model for the real estate transaction.

According to another aspect, a non-transitory computer-readable medium comprising program code that, when executed by one or more processors, cause the one or more processors to perform operations comprising: allowing a user of a spreadsheet program to select a transaction from a list of transactions for a transaction management platform; displaying data fields associated with the selected transaction; mapping the data fields associated with the selected transaction to corresponding cells of a workbook of the spreadsheet program in response to user selections; and updating the data fields associated with the selected transaction with data values from the corresponding cells of the workbook.

According to yet another aspect, a computer-implemented method comprising: allowing a user of a spreadsheet program to select a transaction from a list of transactions for a transaction management platform; creating a mapping sheet in a workbook of the spreadsheet program, the mapping sheet listing, in a first column, data fields associated with the selected transaction; receiving, in a second column of mapping sheet, references to cells of the workbook that correspond to the data fields in the first column; and using the mapping sheet to automatically update the data fields associated with the selected transaction with data values from the corresponding cells of the workbook in response to a user command.

BRIEF DESCRIPTION OF THE DRAWINGS

The accompanying Figures and Examples are provided by way of illustration and not by way of limitation. The foregoing aspects and other features of the disclosure are explained in the following description, taken in connection with the accompanying example figures (also "FIG.") relating to one or more embodiments or examples.

FIG. 1 is a schematic diagram showing installation of a spreadsheet plug-in.

DETAILED DESCRIPTION

For the purposes of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

While the present application is described in connection with transaction management platforms (TMPs) for real estate transactions, one example of which is TermSheet®, other types of transaction management platforms may be used within the scope of the present disclosure. For example, principles of Applicant's disclosure could apply to other types of transactions including, without limitation, traditional private equity (e.g., purchase of companies), venture capital, private placement, advisory (e.g., investment banking, real estate brokerage, debt capital brokerage), and lending (e.g., traditional bank lending, lender finance).

Articles "a" and "an" are used herein to refer to one or to more than one (i.e. at least one) of the grammatical object of the article. By way of example, "an element" means at least one element and can include more than one element.

"About" is used to provide flexibility to a numerical range endpoint by providing that a given value may be "slightly above" or "slightly below" the endpoint without affecting the desired result.

The use herein of the terms "including," "comprising," or "having," and variations thereof, is meant to encompass the elements listed thereafter and equivalents thereof as well as additional elements. As used herein, "and/or" refers to and encompasses any and all possible combinations of one or more of the associated listed items, as well as the lack of combinations where interpreted in the alternative ("or").

As used herein, the transitional phrase "consisting essentially of" (and grammatical variants) is to be interpreted as encompassing the recited materials or steps "and those that do not materially affect the basic and novel characteristic(s)" of the claimed invention. Thus, the term "consisting essentially of" as used herein should not be interpreted as equivalent to "comprising."

Figure 1:
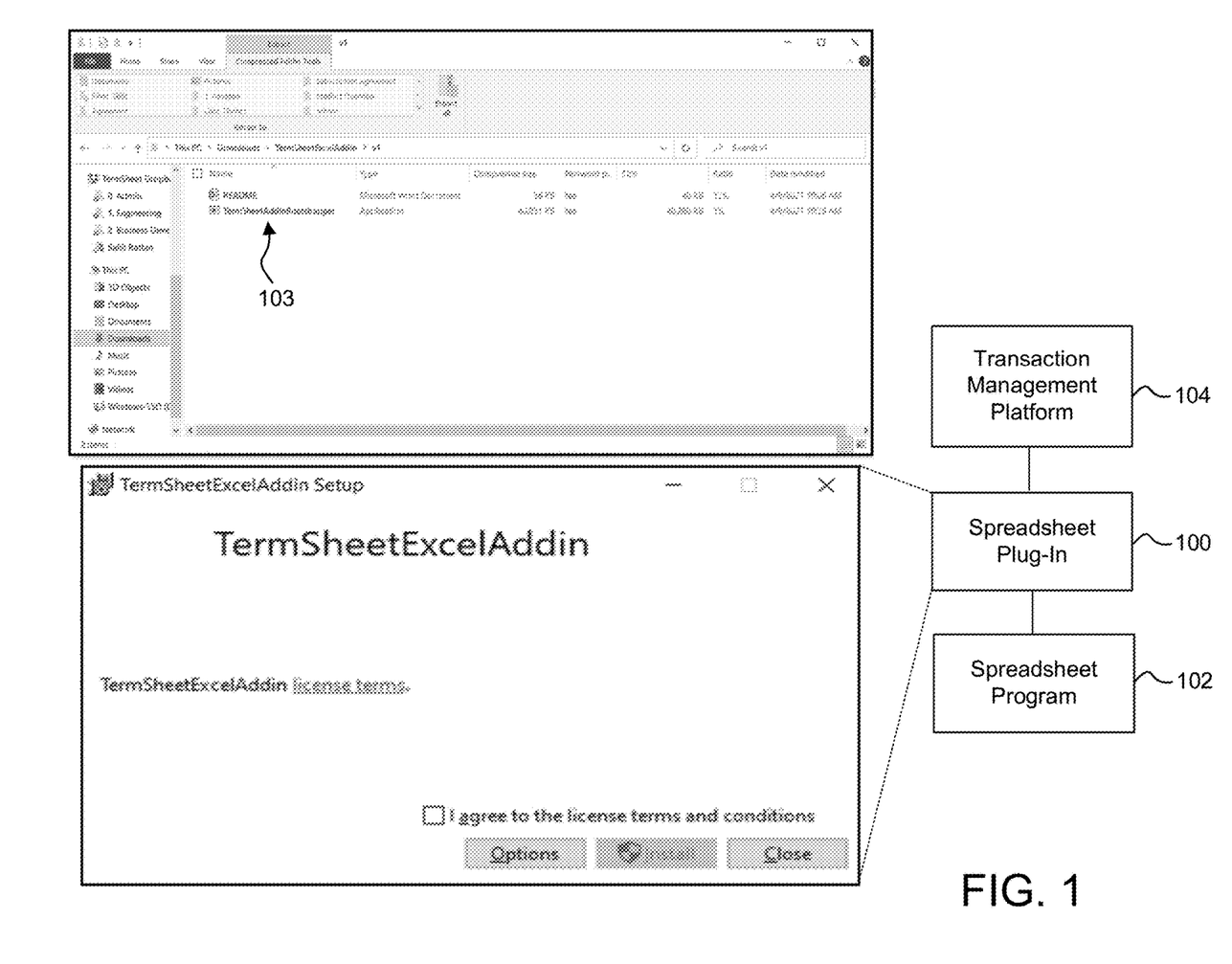

FIG. 1 is a schematic diagram showing installing a spreadsheet plug-in 100 (or "plug-in 100") for a spreadsheet program 102, such as Microsoft® Excel®. A plug-in is a software component that adds a specific feature or feature set to an existing computer program. Other common names for plug-ins include add-ins, add-ons, and the like, all of which are contemplated within the scope of the present disclosure.

In one embodiment, the plug-in 100 provides one- or two-way synchronization of data between the spreadsheet program 102 and a transaction management program 104 (or "TMP 104"). In some embodiments, the TMP 104 is a local application running on a personal computer. In other embodiments, the TMP 104 may operate in the cloud and be accessed via a Web browser. In the latter embodiment, the TMP 104 may be embodied as TMP server. Therefore, reference to TMP 104 contemplates both local and remote applications.

In one implementation, an installer 103 is downloaded to a user's computer via a uniform resource locator (URL). The installer 103 may be bundled as part of an .EXE-file-based application, which installs the required dependencies as well as the code for the plug-in 100. The installer will also create the proper hooks into the TMP 104 as understood by those of skill in the art. Further, the installer 103 will install the appropriate .DLL files in order for the user's spreadsheet program 102 (e.g., Excel®) to display, for example, a Visual Studio Tools for Office (VSTO)-based Excel® integration. However, other techniques can be used in different implementations. For example, component object model (COM), Excel® Dynamic Link Library (XLL), macros, task plane web add-ins, and the like could be used for implementing, or in place of, the plug-in 100.

Figure 2:
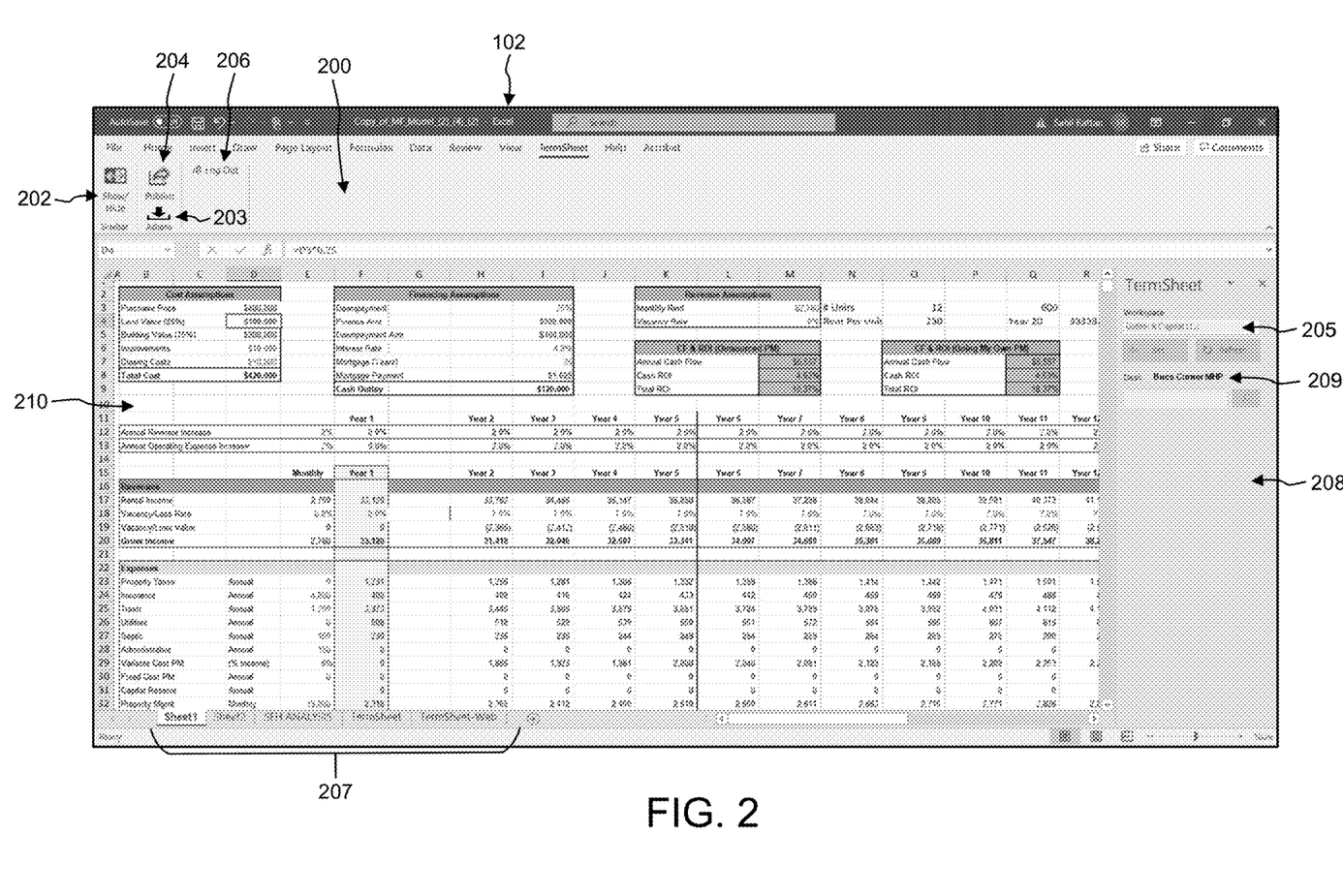
FIG. 2 illustrates an underwriting model in a spreadsheet.

Referring to FIG. 2, once the plug-in 100 is installed, the spreadsheet program 102 may display a custom ribbon 200 (named "TermSheet" in the present example). The custom ribbon 200 may include, without limitation, a show/hide sidebar button 202, an import button 203, a publish button 204, and a log out button 206. The show/hide sidebar button 202 may be used to alternately show and hide a custom panel 208 (named "TermSheet" in the present example), as described more fully below.

In one embodiment, after the user authenticates with the TMP 104 using, for example, a standard email/password-based login mechanism (not shown), the custom panel 208 may display a transaction (or workspace) selection mechanism 205. The transaction selection mechanism 205 may be implemented as a pull-down list of selectable transactions 209 or workspaces associated with the TMP 104. In the context of the present disclosure, a workspace may be conceptualized as a broader strategy and a transaction as a specific instance of that strategy (e.g., workspace can be "Multi-family Boston" and a transaction could be "101 Main St., Boston, MA").

In one example implementation, transactions 209 (e.g., "Bucs Corner MHP") are initially created in the TMP 104 and associated with an active workbook 207 in the spreadsheet program 102. However, in other embodiments, a transaction may be initially defined in the workbook 207 and published to the TMP 104. A worksheet (or sheet) is a single page in a file created with an electronic spreadsheet program like Microsoft Excel®. A workbook is an Excel® or other spreadsheet file that contains one or more worksheets.

In the example of FIG. 2, the workbook 207 includes five visible worksheets ("Sheet1," "Sheet2," "SFH Analysis," "TermSheet," "TermSheet-Web"), although the workbook 207 could contain any number of worksheets for complex transactions. One or more of the worksheets may be used for interfacing the spreadsheet program 102 with the TMP 104, as described more fully below.

In one embodiment, the association between a transaction 209 in the TMP 104 and the workbook 207 may be stored within a hidden worksheet (not shown) as metadata, which may include, without limitation, a name, number, or other identifier of a transaction, a uniform resource locator (URL), an internet protocol (IP) address, a globally unique identifier (GUID), an indication of the last time/date that the TMP 104 has been updated with data from the workbook 207, and the like. Alternatively, or in addition, metadata may be stored in the mapping sheet 302 as a field.

One or more worksheets of the workbook 207 may contain an underwriting model 210. In real estate, underwriting is the process of reviewing a loan application to determine the amount of risk involved. The underwriter will look at the borrower's financial standing and the value of the property to determine the potential of the transaction. An underwriting model 210 is a type of financial model to project, for example, cash flows and the likelihood of those cash flows coming to fruition. The inputs for the underwriting model 210 will vary depending on the circumstances, but generally include standard variables like income and expenses, along with more advanced variables like discount rates and likelihoods of success. As used herein, "underwriting model" should be construed broadly to encompass any type of financial model including, without limitation, a cash flow model, a proforma model, an acquisition model, a loan sizer, etc., which can be represented using a spreadsheet program 102. The underwriting model 210 may include various data values as well as formulas, macros, and the like, which may be executed by the spreadsheet program 102.

Once a transaction 209 is selected via the transaction selection mechanism 205, the custom panel 208 (shown to the right of the spreadsheet workbook 207) will indicate the selected transaction 209 ("Bucs Corner MHP"). In other embodiments, the custom ribbon 200 and custom panel 208 may be positioned in different locations. The log out button 206 allows the user to log out and remove the connection with the TMP 104 which will also disable the import button 203 and publish button 204 in some embodiments.

Figure 3A:
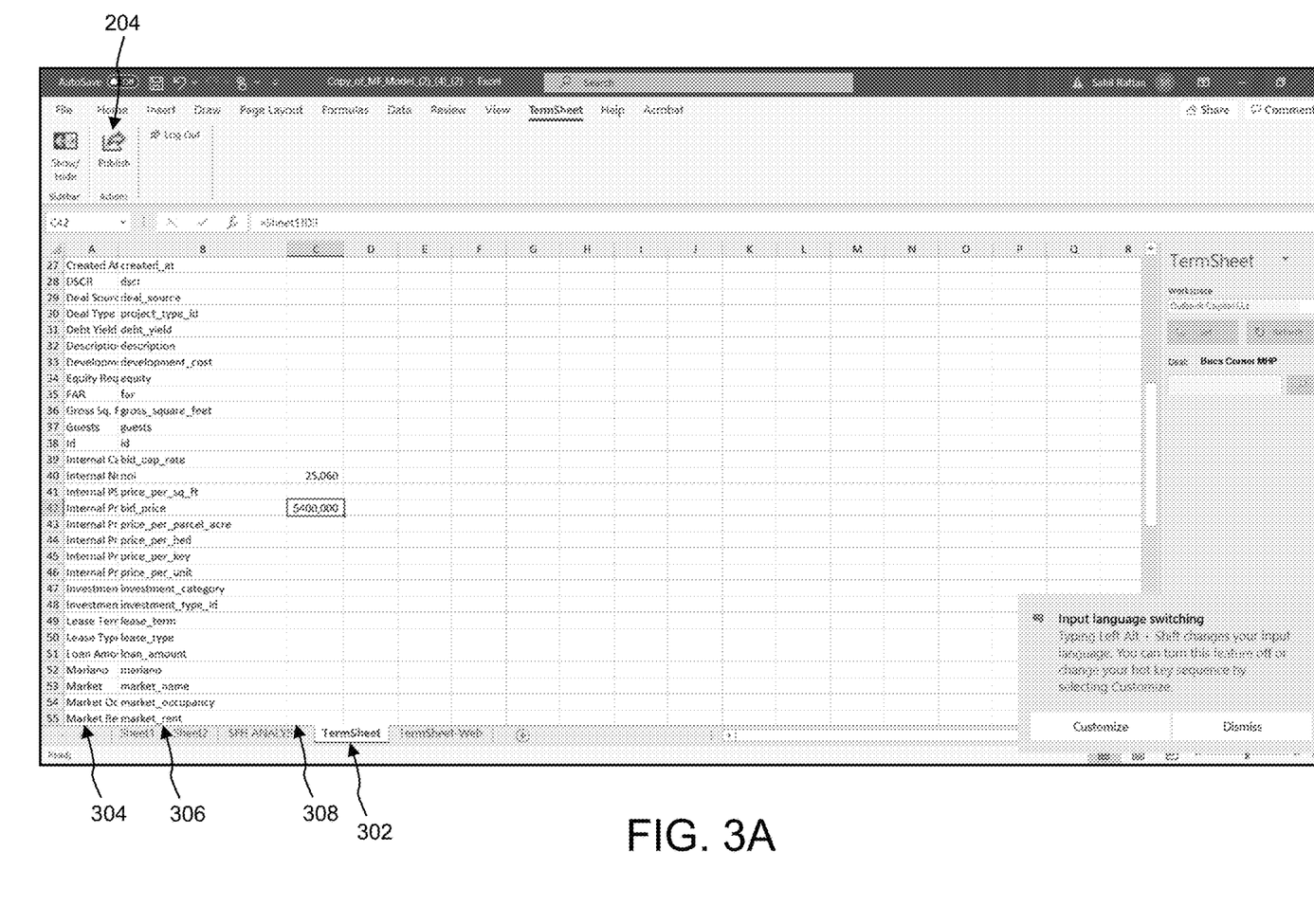
FIG. 3A illustrates mapping cells of a spreadsheet workbook to data fields of a TMP.

Referring also to FIG. 3A, after a transaction 209 is selected, a mapping sheet 302 (named "TermSheet" in the present example) is automatically added to the open workbook 207 if the mapping sheet 302 does not already exist. In one embodiment, the mapping sheet 302 facilitates mapping of data fields of the TMP 104 with cells of the workbook 207. This association may be maintained throughout the lifecycle of the spreadsheet workbook 207 so that anyone who subsequently opens the same spreadsheet workbook 207 is also authenticated via the plug-in 100 to the same account.

The example mapping sheet 302 of FIG. 3A includes three columns (304, 306, 308) corresponding to columns A-C, respectively. Column 306 may correspond to the name of a data field ("field") within the TMP 104 (e.g., "bid_price"). The fields may be defined at the time the transaction 209 is created and may vary between transactions 209.

Column 308 may include, for each field of column 306, a corresponding link, reference, or formula involving a cell within the workbook 207 containing the underwriting model 210. For example, cell C42 of the mapping sheet 302 may contain "=Sheet1@D3" referencing cell D3 of Sheet 1 (the underwriting model 210), which shows a value of $400,000 in the present example. The column 308 may receive user input containing the reference in various ways. For example, the user could type the reference in the appropriate cell of the column 308 immediately to the right of the corresponding data field in column 306.

Optionally, the mapping sheet 302 may include a column 304 of text labels, each of which may describe the purpose and/or function of the corresponding field within TMP 104. With the mapping sheet 302 in place, the user can map any sheets/cells in the local spreadsheet workbook 207 to the appropriate fields, including any user generated fields, in the TMP 104.

In the embodiment of FIG. 3A, mapping of fields to spreadsheet data happens in the spreadsheet program 102. However, in other implementations, mapping may occur within the TMP 104. In some embodiments, a mapping sheet 302 might not be used. Rather, macros could monitor for changes in cells and map from those cells in the spreadsheet workbook 207 (underwriting model 210) to fields in the TMP 104. In still other embodiments, explicit mapping may be performed within the plug-in 100 itself, which may provide a user interface ("UI") (not shown) that allows for a mapping from the cells in the spreadsheet workbook 207 to fields in the TMP 104. In further embodiments, dragging and dropping from field definitions in the UI of the plug-in 100 to cells in the spreadsheet workbook 207 may be performed without the need for an explicit mapping sheet 302.

When the user is ready to publish their changes from the local workbook 207 to the TMP 104, the user may press the publish button 204 or otherwise issue a command within the context of the custom ribbon 200. In one embodiment, the plug-in 100, in cooperation with the spreadsheet program 102, may perform one or more of the steps shown in FIG. 3B.

Figure 3B:
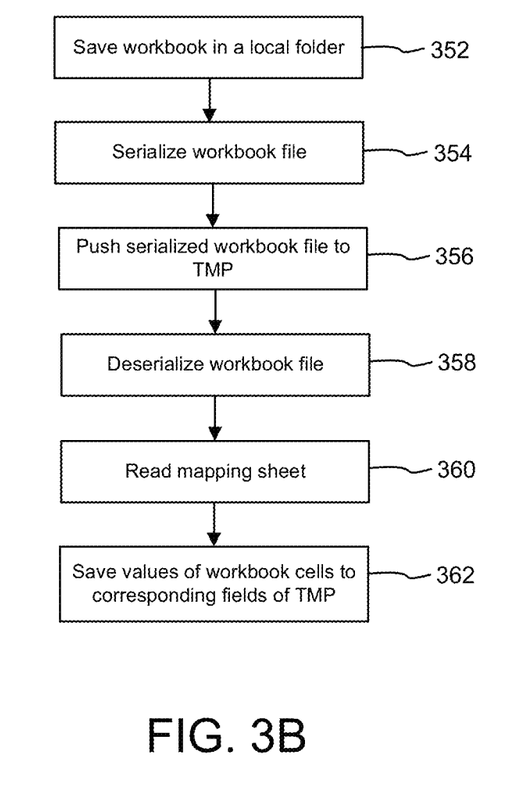
FIG. 3B is a flowchart of a process of publishing a workbook to a TMP.

First, the open workbook 207 may be saved 352 within a local folder to allow for publishing to the TMP 104. Where TMP 104 is operating in the cloud or a remote server, the actual manipulation of the data may not happen locally on the user's computer. Rather, it happens on the TMP 104 after the workbook 207 has been published. This may provide two advantages. First, the user can change the logic of how fields are mapped and read in at any time on the TMP 104 as opposed to have to push a new change to the installed plug-in 100. Installing or updating to a new version of the plug-in 100 when changes are made is not required. Second, this can speed up the plug-in 100. As a result, of the following steps are applicable to an embodiment including a TMP 104 operating remotely or in the cloud.

Next, the workbook 207 may be serialized 354 into an appropriate format, such as Base64, which a group of binary-to-text encoding schemes that represent binary data (more specifically, a sequence of 8-bit bytes) in sequences of 24 bits that can be represented by four 6-bit Base64 digits. Common to all binary-to-text encoding schemes, Base64 is designed to carry data stored in binary formats across channels that only reliably support text content. Base64 is particularly prevalent on the World Wide Web where one of its uses is the ability to embed image files or other binary assets inside textual assets such as HTML and CSS files. The serialized workbook 207 may then be pushed 356 to the TMP 104 using the Hypertext Transfer Protocol (HTTP) or the like.

At the TMP 104, the serialized workbook 207 may be deserialize 358, after which the mapping sheet 302 is read 360 to determine how cells of the workbook 207 are to be mapped to fields within the TMP 104. Finally, the values of cells within the workbook 207 are saved 362 (copied) to corresponding fields of the related transaction 209 within the TMP 104.

Figure 4A:
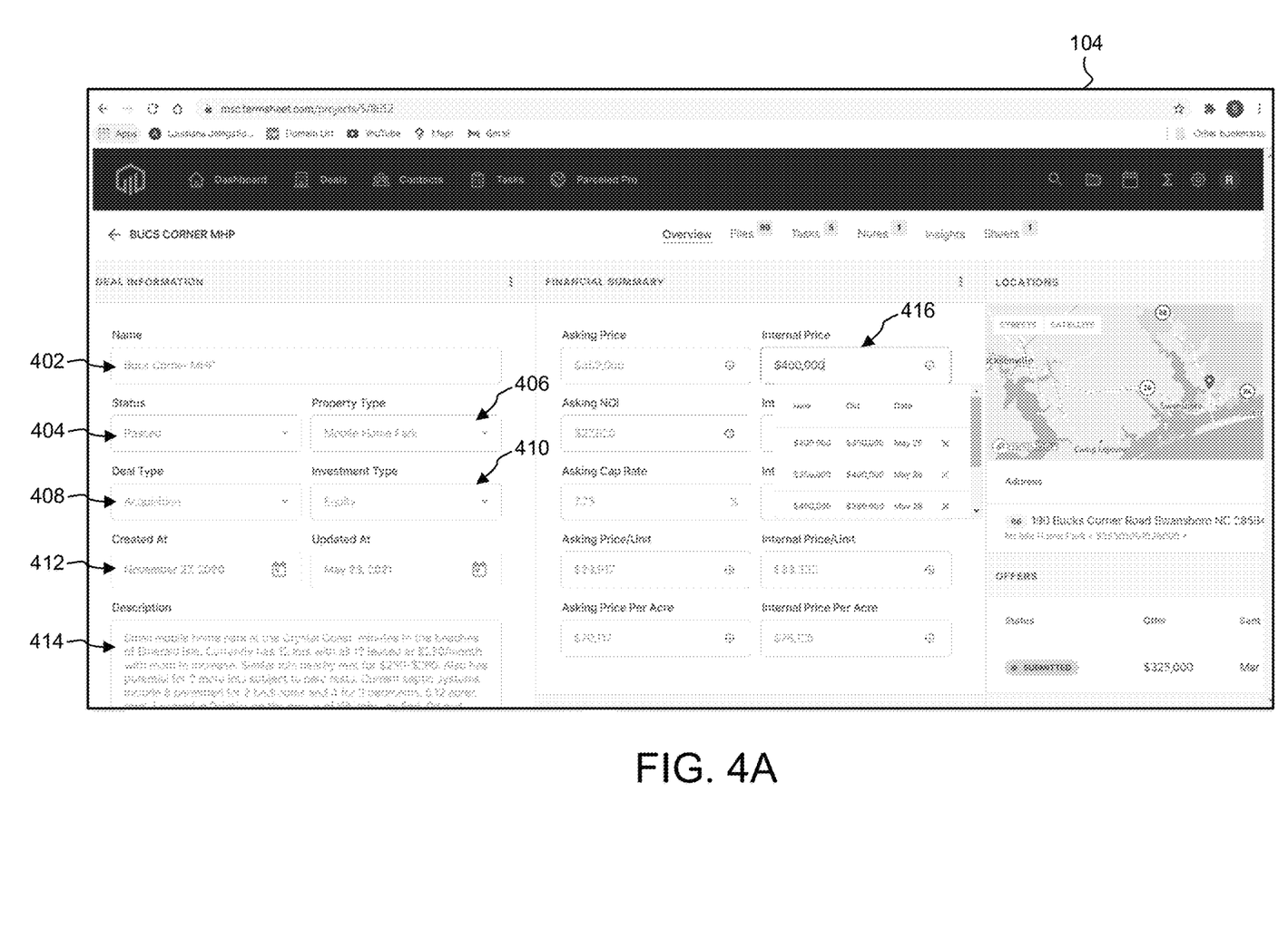
FIG. 4A and FIG. 4B illustrate a user interface of a TMP.

FIG. 4A illustrates a UI provided by the TMP 104 including various fields pertinent to the transaction 209, e.g., transaction name 402 (e.g., "Bcs Corner MHP"), status 404 (e.g., "passed"), property type 406 (e.g., "mobile home park"), deal type 408 (e.g., "acquisition"), investment type 410 (e.g., "debt" or "equity"), creation date 412, description 414, etc. Each of the foregoing fields may have a corresponding field name within the mapping sheet 302, which is defined at the time the transaction 209 is created. As an example, the TMP 104 may allow a user to specify an internal price 416, which is identified in the mapping sheet 302 by the field name bid_price and corresponds to cell D3 in sheet1 the workbook 207 of FIG. 2. Accordingly, when the user types a value of $400,000 into cell D3 and presses the publish button 204, the value from cell D3 is copied to the bid_price field of the TMP 104 and displayed.

Figure 4B:
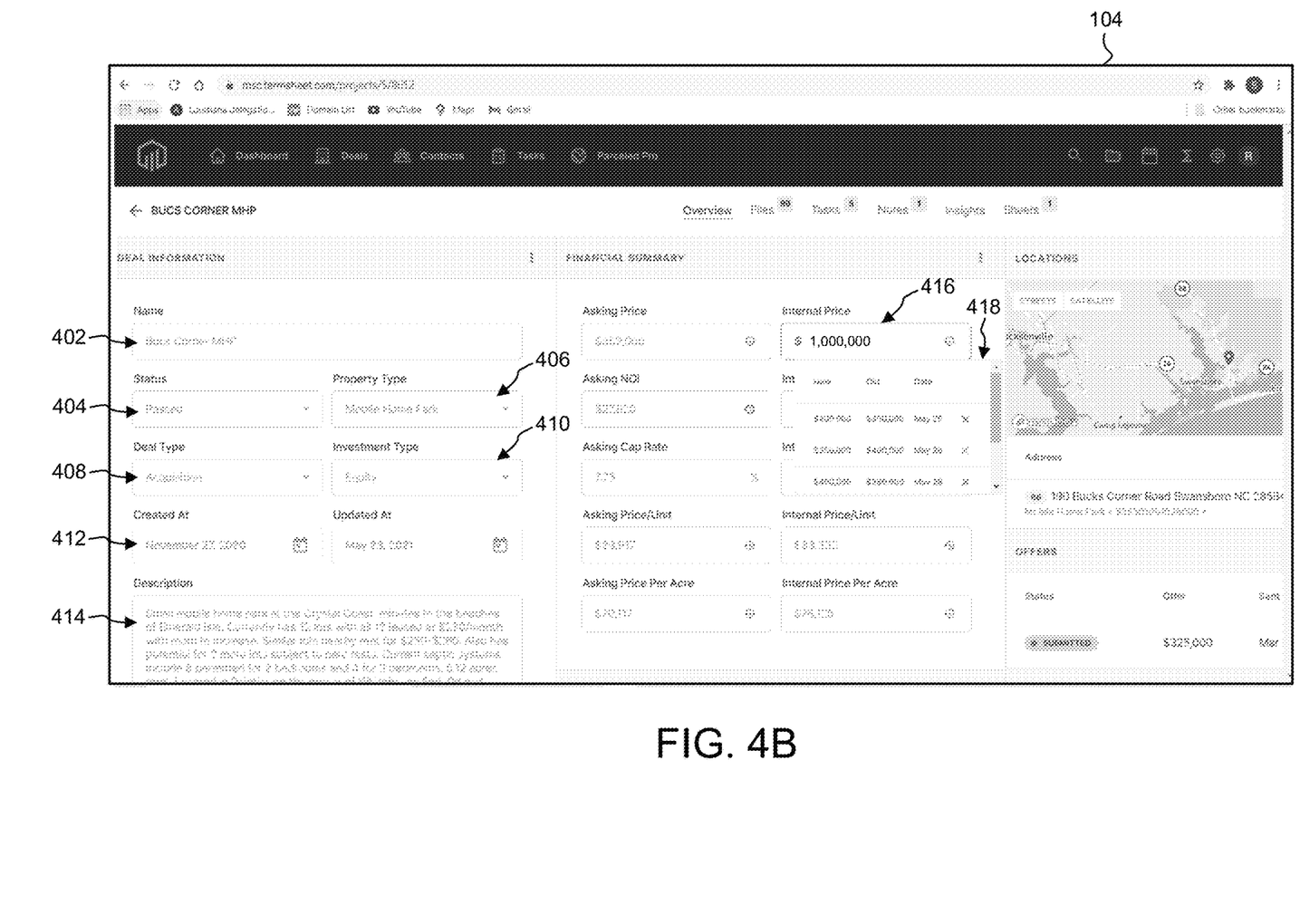

As previously noted, transfer of data between the spreadsheet program 102 and the TMP 104 may be bidirectional. As shown in FIG. 4B, the user may specify a different value for the internal price 416, e.g., $1,000,000 as opposed to $400,000. In one embodiment, if the user selects or hovers over any of the fields, the TMP 104 may display a change history 418 showing how the value of the field (e.g., internal price 416) has been changed over time.

Figure 4C:
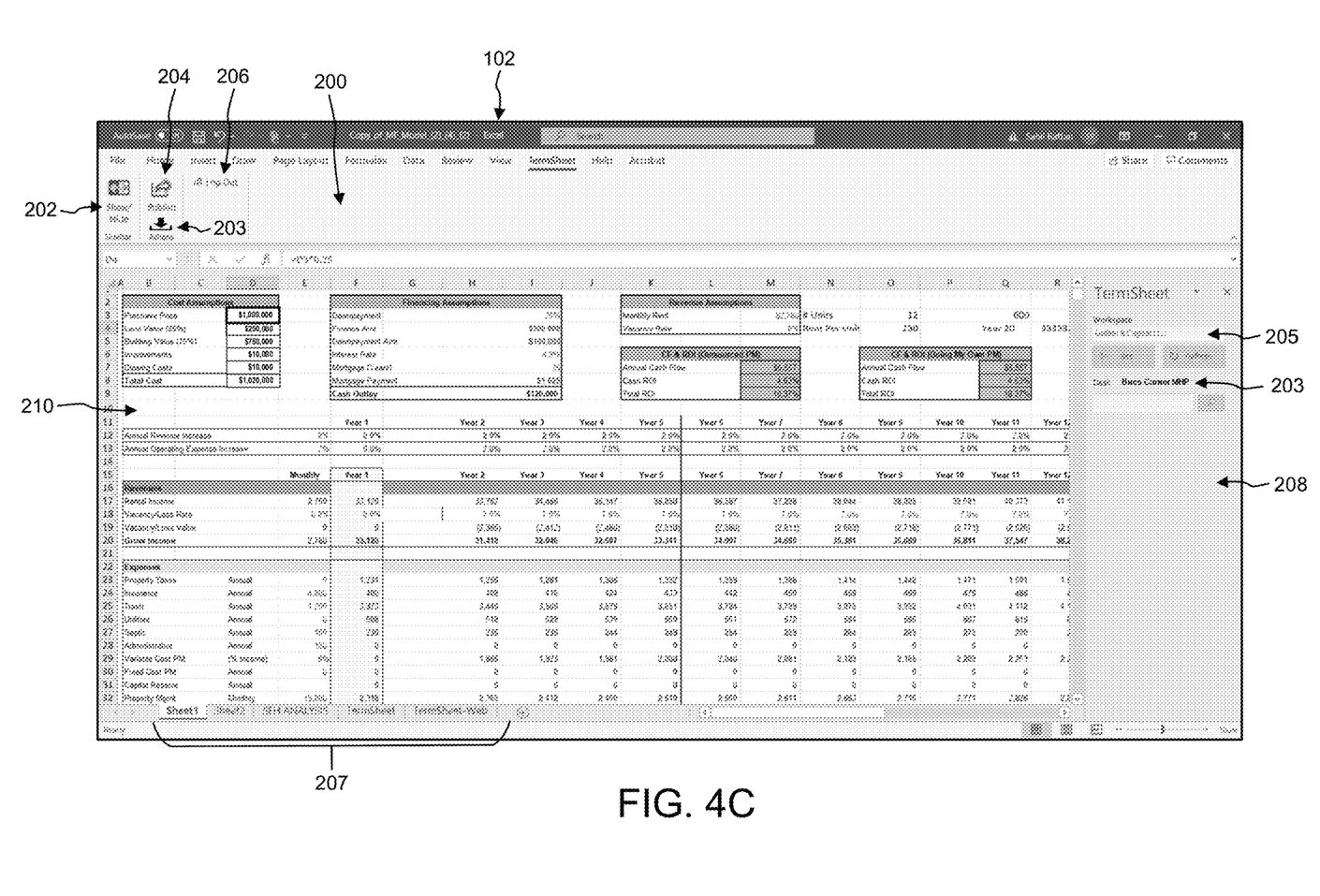
FIG. 4C illustrates an underwriting model in a spreadsheet workbook.

Referring to FIG. 4C, if the user subsequently presses the import button 203, a reverse of the process shown in FIG. 3B may occur. Values of fields within the TMP 104 may be read and mapped to the corresponding cells within the workbook 207 using the mapping sheet 302 or similar mechanism. As a result, cell D3 of the workbook 207 is updated to $1,000,000 and other cells relying on this value based on formulas, macros, are the like, are similarly updated to reflect the new assumption.

In some embodiments, transfer of data between the TMP 104 and the spreadsheet program 102 is automatic, such that if a field of the TMP 104 is updated, the corresponding cell in the workbook 207 of the spreadsheet program 102 is automatically updated, immediately or predetermined intervals, without the user having to press the import button 203. Likewise, any cells updated in the workbook 207 can be automatically updated in corresponding fields of the TMP 104 without having to press the publish button 204. Such bidirectional communication could be enabled by the plug-in 100 in concert with macros operating on the spreadsheet program 102.

Figure 5:
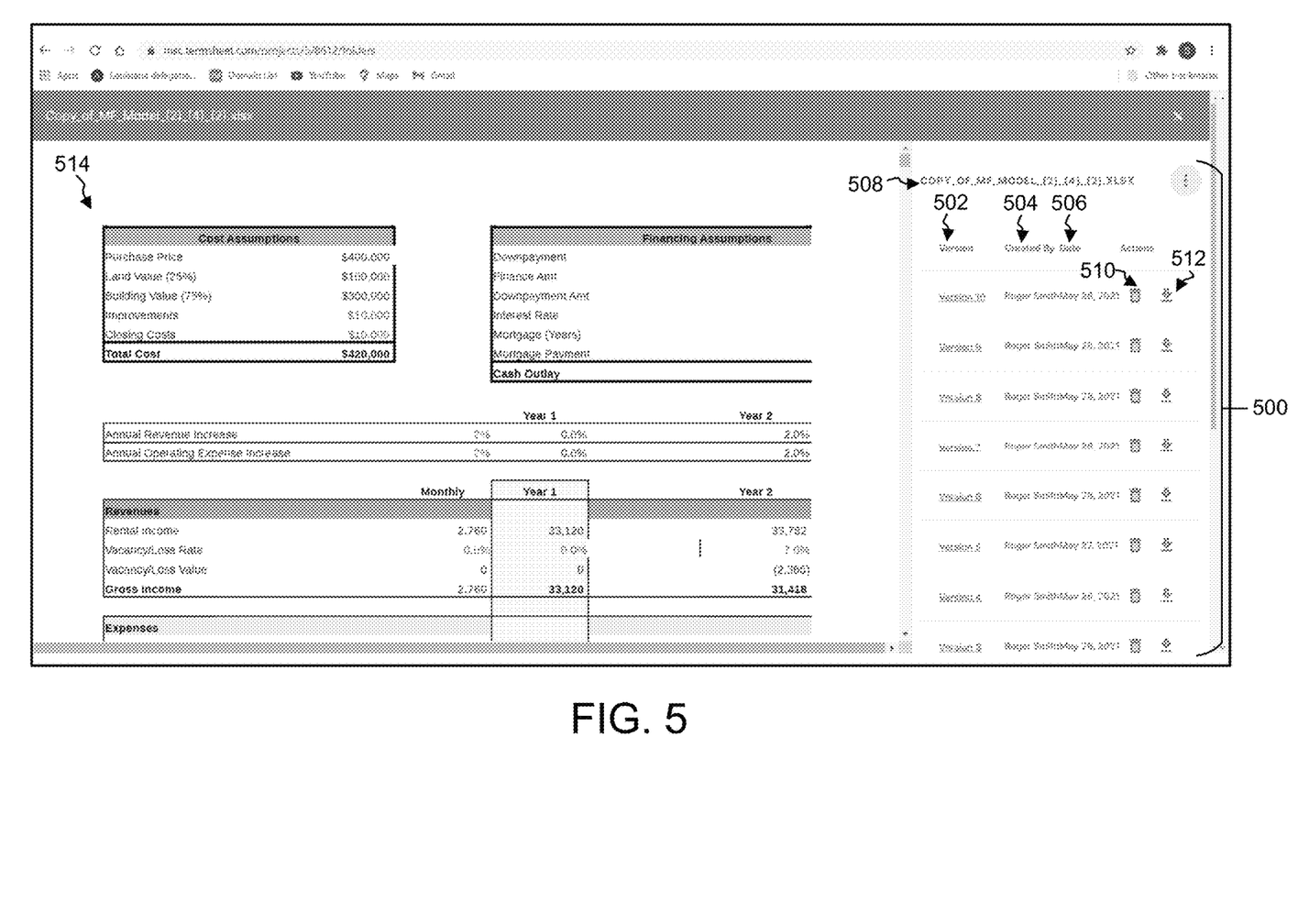
FIG. 5 is a version management user interface provided by TMP.

In one embodiment, the mapping/saving logic is on the TMP 104 (e.g., in a TMP server operating in the cloud) as opposed to the locally installed plug-in 100, as it provides more control and ability to update logic as needed instead of having to deploy a new code update to the plug-in 100. In such a case, the system is able to maintain versions of the workbooks 207 within the TMP 104. FIG. 5 illustrates a version history 500 in a UI provided by the TMP 104. In the present example, the version history 500 includes, for each version pushed to the TMP 104, a version number 502, a created by field 504, a creation date field 506, and a file name 508 of the workbook 207 ("COPY OF MF MODEL_(2)_(4)_(2).XLSX"), and the like. The version history 500 may be presented with various actions that can be executed by clicking on an icon next a particular version, such as a delete action 510 or a download action 512. The delete action 510 may delete a particular version of a workbook 207 from the TMP 104. The download action 512 may download a particular version of a workbook 207 from the TMP 104 and store it on a user's local computer.

In some embodiments, the user may be able to point to (or single-click) a version of a workbook 207 without selection thereof (selection may require a double-click using a pointing device like a mouse). In response, a preview 514 of the underwriting model 210 may be displayed, allowing the user to see what data values/assumptions were included in the particular underwriting model 210.

The version history 500 provides for a rich experience for users, who can now maintain version control of their underwriting models 210 instead of having to change file names. In addition, because the association to the related transaction is maintained, any user who has the plug-in 100 installed and authenticated can download a version and immediately begin editing where the last person left off.

Figure 6:
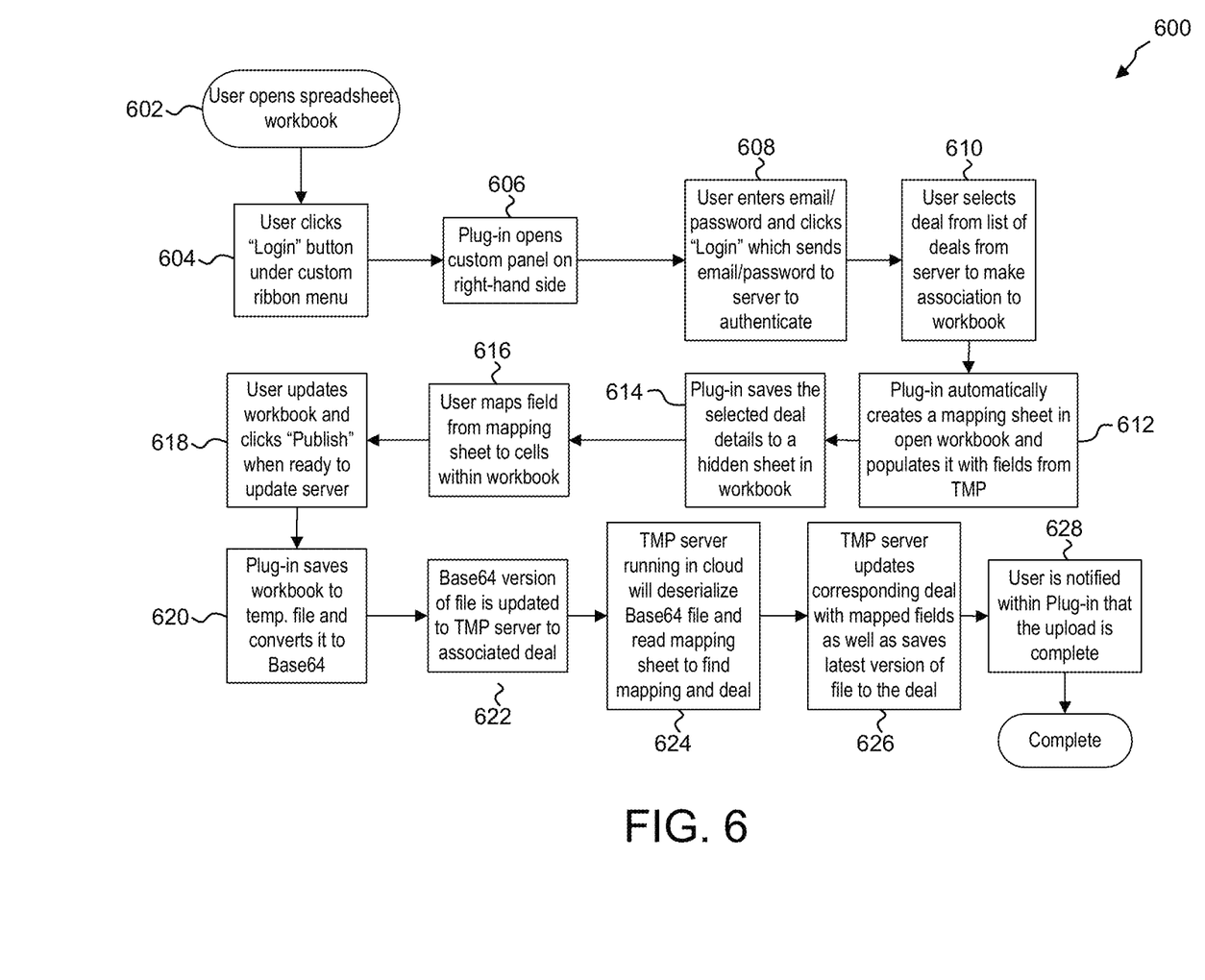
FIG. 6 is a flowchart of a process of interfacing a spreadsheet with a transaction management platform.

FIG. 6 is a flowchart of a process 600 of interfacing a spreadsheet workbook 207 with a TMP 104. With continuing reference to FIG. 2, at step 602, a user opens the spreadsheet workbook 207. At step 604, the user clicks on a "login" button or the like under a custom ribbon 200. At step 606, the plug-in 100 opens a custom panel 208 on the right-hand side of the spreadsheet workbook 207. At step 608, the user authenticates with the TMP 104 by providing, for instance, their email/password credentials and clicks "login," which sends the email/password to the server to authenticate. At step 610, the user selects a transaction from a list of transactions from the server to make an association to the spreadsheet workbook 207.

At step 612, the plug-in 100 automatically creates a mapping sheet 302 in the open workbook 207 and populates it with fields from the TMP 104. Thereafter, at step 614, the plug-in 100 saves the selected transaction details to a hidden sheet in the workbook 207. At step 616, the user maps fields from the created mapping sheet 302 to cells within the workbook 207.

At step 618, when the user is finished making any updates to the spreadsheet workbook 207, the user clicks "publish" when they are ready to update the server. At step 620, the plug-in 100 saves the workbook 207 to a temporary file and converts it into Base64. Thereafter, at step 622, the Base64 version of the file is updated to the TMP 104 to the associated transaction. At step 624, the TMP 104 running, in one embodiment, in the cloud will deserialize the Base64 file and read the mapping sheet 302 to find the mapping and transaction. At step 626, the TMP 104 updates the corresponding transaction with the mapped fields as well as saves the latest version of the file to the transaction. At step 628, the user is notified within the plug-in 100 that the upload is complete.

Figure 7:
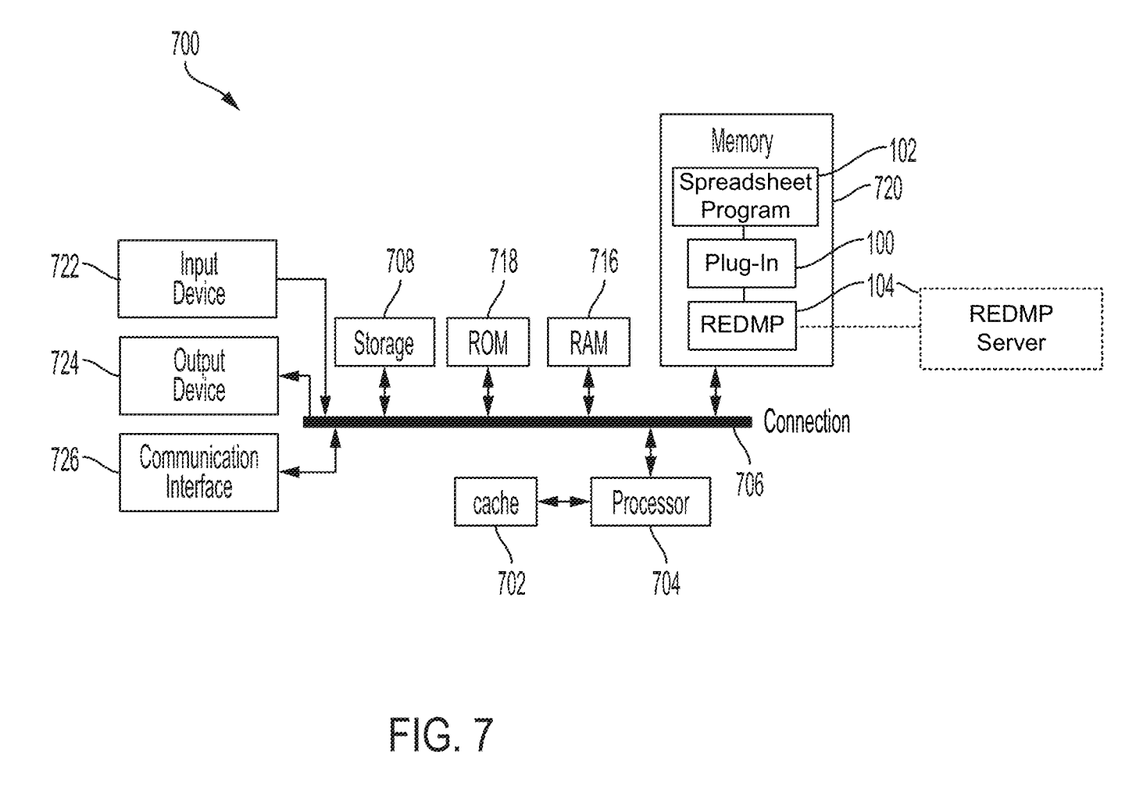
FIG. 7 is a schematic diagram computing system for implementing certain aspects of the present technology

FIG. 7 illustrates an example computing system 700 for implementing certain aspects of the present technology. In this example, the components of the system 700 are in electrical communication with each other using a connection 706, such as a bus. The system 700 includes one or more processing units (CPU or processor) 704 and a connection 706 that couples various system components including a memory 720, such as read only memory (ROM) 718 and random-access memory (RAM) 716, to the processor 704.

The system 700 can include a cache of high-speed memory connected directly with, in close proximity to, or integrated as part of the processor 704. The system 700 can copy data from the memory 720 and/or the storage device 708 to cache 702 for quick access by the processor 704. In this way, the cache can provide a performance boost that avoids processor 704 delays while waiting for data. These and other modules can control or be configured to control the processor 704 to perform various actions. Other memory 720 may be available for use as well. The memory 720 can include multiple different types of memory with different performance characteristics. The memory 720 may be used to store various programs or modules, such as the spreadsheet program 102 and spreadsheet workbook (not shown), the plug-in 100, and the TMP 104. Alternatively, the memory 720 may store an application program or web browser for accessing the TMP 104 running, for example, in the cloud.

The processor 704 can include any general-purpose processor or number thereof. The processor 704 may be a completely self-contained computing system, containing multiple cores or processors, a bus, memory controller, cache, etc. A multi-core processor may be symmetric or asymmetric.

To enable user interaction with the computing system 700, an input device 722 can represent any number of input mechanisms, such as a microphone for speech, a touch-sensitive screen for gesture or graphical input, keyboard, mouse, motion input, speech and so forth. An output device 724 can also be one or more of a number of output mechanisms known to those of skill in the art. In some instances, multimodal systems can enable a user to provide multiple types of input to communicate with the computing system 700. The communications interface 726 can generally govern and manage the user input and system output. There is no restriction on operating on any particular hardware arrangement and therefore the basic features here may easily be substituted for improved hardware or firmware arrangements as they are developed.

Storage device 708 is a non-volatile memory and can be a hard disk or other types of computer readable media which can store data that are accessible by a computer, such as magnetic cassettes, flash memory cards, solid state memory devices, digital versatile disks, cartridges, random access memory (RAM) 716, read only memory (ROM) 718, and hybrids thereof.

The storage device 708 can be connected to the connection 706. In one aspect, a hardware module that performs a particular function can include the software component stored in a computer-readable medium in connection with the necessary hardware components, such as the processor 704, connection 706, output device 724, and so forth, to carry out the function.

It is to be understood that the systems described herein can be implemented in hardware, software, firmware, or combinations of hardware, software and/or firmware. In some examples, image processing may be implemented using a non-transitory computer readable medium storing computer executable instructions that when executed by one or more processors of a computer cause the computer to perform operations. Computer readable media suitable for implementing the control systems described in this specification include non-transitory computer-readable media, such as disk memory devices, chip memory devices, programmable logic devices, random access memory (RAM), read only memory (ROM), optical read/write memory, cache memory, magnetic read/write memory, flash memory, and application-specific integrated circuits. In addition, a computer readable medium that implements an image processing system described in this specification may be located on a single device or computing platform or may be distributed across multiple devices or computing platforms.

One skilled in the art will readily appreciate that the present disclosure is well adapted to carry out the objects and obtain the ends and advantages mentioned, as well as those inherent therein. The present disclosure described herein are presently representative of preferred embodiments, are exemplary, and are not intended as limitations on the scope of the present disclosure. Changes therein and other uses will occur to those skilled in the art which are encompassed within the spirit of the present disclosure as defined by the scope of the claims.

No admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinence of any of the documents cited herein. All references cited herein are fully incorporated by reference, unless explicitly indicated otherwise. The present disclosure shall control in the event there are any disparities between any definitions and/or description found in the cited references.

What is claimed is:

1. A system comprising:
   a transaction management platform; and
   a plug-in for a spreadsheet program, wherein the plug-in comprises program code that, when executed by one or more processors, causes the one or more processors to perform operations comprising:
   creating a list of transactions within the transaction management platform, wherein each respective transaction in the list of transactions is associated with a respective workbook in the spreadsheet program;
   creating, in the respective workbook, a respective mapping sheet for the respective transaction, wherein the respective mapping sheet is a respective first spreadsheet within the respective workbook;
   creating, in the respective workbook, a respective second spreadsheet including a respective underwriting model for the respective transaction;
   wherein the respective first spreadsheet, including the respective mapping sheet, and the respective second spreadsheet, including the respective underwriting model, are both displayable in the spreadsheet program via respective tabs of the respective workbook;
   displaying at least one of a custom ribbon or a custom panel within the spreadsheet program including:
   a first control for selecting a transaction from the list of transactions for the transaction management platform; and
   a second control for publishing data from the spreadsheet program to the transaction management platform;
   allowing a user of the spreadsheet program to select, via the first control, a transaction from the list of transactions for the transaction management platform;
   displaying data fields associated with the selected transaction within a mapping sheet of a workbook associated with the selected transaction;
   allowing the user to map, within the mapping sheet of the workbook associated with the selected transaction rather than a separate application, the data fields associated with the selected transaction to corresponding cells of a second spreadsheet of the workbook associated with the selected transaction including an underwriting model; and updating, in response to activation of the second control, the data fields associated with the selected transaction with data values from the corresponding cells of the second spreadsheet of the workbook associated with the selected transaction including the underwriting model.

2. The system of claim 1, wherein displaying the data fields comprises displaying the mapping sheet in response to selecting a tab corresponding to the mapping sheet in the workbook.

3. The system of claim 2, wherein the mapping sheet comprises a first column including names of the data fields and a second column including references to the corresponding cells within the second spreadsheet including the underwriting model.

4. The system of claim 1, the operations further comprising:
saving metadata of the selected transaction in a hidden sheet of the workbook, the metadata including a transaction identifier and an indication of a last time and date that the transaction management platform has been updated with data from the workbook.

5. The system of claim 1, wherein updating the data fields associated with the selected transaction is performed in response to a user command.

6. The system of claim 1, wherein updating the data fields associated with the selected transaction is performed automatically in response to a change in a data value of a cell or at predetermined intervals.

7. The system of claim 1, the operations further comprising:
updating one or more cells of the workbook with data values from corresponding data fields of the selected transaction.

8. The system of claim 1, wherein:
the transaction comprises a real estate transaction; and
the transaction management platform provides document management and workflow management features.

9. The system of claim 1, wherein updating comprises:
within the spreadsheet program:
serializing the workbook; and
pushing the serialized workbook from the spreadsheet program to the transaction management platform; and
within the transaction management platform:
deserializing the serialized workbook;
reading the mapping sheet from the serialized workbook; and
saving the data values of from the corresponding cells of the second spreadsheet of the serialized workbook containing the underwriting model to the corresponding data fields in the transaction management platform associated with the selected transaction according to the mapping sheet.

10. A non-transitory computer-readable medium comprising program code that, when executed by one or more processors, cause the one or more processors to perform operations comprising:
creating a list of transactions within a transaction management platform, wherein each respective transaction in the list of transactions is associated with a respective workbook in a spreadsheet program;
creating, in the respective workbook, a respective mapping sheet for the respective transaction, wherein the respective mapping sheet is a respective first spreadsheet within the respective workbook;
creating, in the respective workbook, a respective second spreadsheet including a respective underwriting model for the respective transaction;
wherein the respective first spreadsheet, including the respective mapping sheet, and the respective second spreadsheet, including the respective underwriting model, are both displayable in the spreadsheet program via respective tabs of the respective workbook;
displaying at least one of a custom ribbon or a custom panel within the spreadsheet program including:
a first control for selecting a transaction from the list of transactions for the transaction management platform; and
a second control for publishing data from the spreadsheet program to the transaction management platform;
allowing a user of the spreadsheet program to select, via the first control, a transaction from the list of transactions for the transaction management platform;
displaying data fields associated with the selected transaction within a mapping sheet of a workbook associated with the selected transaction in response to selecting a tab corresponding to the mapping sheet in the workbook;
allowing the user to map, within the mapping sheet of the workbook associated with the selected transaction rather than a separate application, the data fields associated with the selected transaction to corresponding cells of a second spreadsheet of the workbook associated with the selected transaction including an underwriting model; and
updating, in response to activation of the second control, the data fields associated with the selected transaction with data values from the corresponding cells of the second spreadsheet of the workbook associated with the selected transaction including the underwriting model.

11. The non-transitory computer-readable medium of claim 10, wherein displaying the data fields comprises displaying the mapping sheet.

12. The non-transitory computer-readable medium of claim 11, wherein the mapping sheet comprises a first column including names of the data fields and a second column including references to the corresponding cells within the second spreadsheet containing the underwriting model.

13. The non-transitory computer-readable medium of claim 10, further comprising:
saving metadata of the selected transaction in a hidden sheet of the workbook, the metadata including a transaction identifier and an indication of a last time and date that the transaction management platform has been updated with data from the workbook.

14. The non-transitory computer-readable medium of claim 10, wherein updating the data fields associated with the selected transaction is performed in response to a user command.

15. The non-transitory computer-readable medium of claim 10, wherein updating the data fields associated with the selected transaction is performed automatically in response to a change in a data value of a cell or at predetermined intervals.

16. The non-transitory computer-readable medium of claim 10, further comprising:

updating one or more cells of the workbook with data values from corresponding data fields of the selected transaction.

17. The non-transitory computer-readable medium of claim 10, wherein:
the transaction comprises a real estate transaction; and
the transaction management platform provides document management and workflow management features.

18. A computer-implemented method comprising:
creating a list of transactions within a transaction management platform, wherein each respective transaction in the list of transactions is associated with a respective workbook in a spreadsheet program;
creating, in the respective workbook, a respective mapping sheet for the respective transaction, wherein the respective mapping sheet is a respective first spreadsheet within the respective workbook;
creating, in the respective workbook, a respective second spreadsheet including a respective underwriting model for the respective transaction;
wherein the respective first spreadsheet, including the respective mapping sheet, and the respective second spreadsheet, including the respective underwriting model, are both displayable in the spreadsheet program via respective tabs of the respective workbook;
displaying at least one of a custom ribbon or a custom panel within the spreadsheet program including:
a first control for selecting a transaction from the list of transactions for the transaction management platform; and
a second control for publishing data from the spreadsheet program to the transaction management platform;
allowing a user of the spreadsheet program to select, via the first control, a transaction from the list of transactions for the transaction management platform;
displaying data fields associated with the selected transaction within a mapping sheet of a workbook associated with the selected transaction;
allowing the user to map, within the mapping sheet of the workbook associated with the selected transaction rather than a separate application, the data fields associated with the selected transaction to corresponding cells of a second spreadsheet of the workbook associated with the selected transaction including an underwriting model; and
updating, in response to activation of the second control, the data fields associated with the selected transaction with data values from the corresponding cells of the second spreadsheet of the workbook associated with the selected transaction including the underwriting model.

* * * * *